US010296473B2

(12) United States Patent
Benisty

(10) Patent No.: US 10,296,473 B2
(45) Date of Patent: May 21, 2019

(54) SYSTEM AND METHOD FOR FAST EXECUTION OF IN-CAPSULE COMMANDS

(71) Applicant: Western Digital Technologies, Inc., San Jose, CA (US)

(72) Inventor: Shay Benisty, Be'er Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/651,544

(22) Filed: Jul. 17, 2017

(65) Prior Publication Data
US 2019/0018805 A1    Jan. 17, 2019

Related U.S. Application Data

(63) Continuation-in-part of application No. 15/468,620, filed on Mar. 24, 2017.

(51) Int. Cl.
*G06F 13/16* (2006.01)
(52) U.S. Cl.
CPC ...... *G06F 13/1642* (2013.01); *G06F 13/1668* (2013.01)
(58) Field of Classification Search
CPC .... G06F 3/0659; G06F 3/0679; G06F 9/4881; G06F 3/0688; G06F 3/0656; G06F 3/061; G06F 1/329
USPC ........ 718/102, 100, 103, 105; 710/5, 52, 39, 710/54, 263, 264, 6, 112
See application file for complete search history.

(56) References Cited

U.S. PATENT DOCUMENTS

| | | | | |
|---|---|---|---|---|
| 9,817,761 | B2 * | 11/2017 | Ben-Shemesh | ......... G06F 12/02 |
| 10,095,442 | B2 * | 10/2018 | Myouga | ................ G06F 3/0659 |
| 2004/0199732 | A1 * | 10/2004 | Kelley | .................. G06F 9/3814 |
| | | | | 711/158 |
| 2006/0161733 | A1 | 7/2006 | Beckett et al. | |
| 2008/0109573 | A1 * | 5/2008 | Leonard | .................. G06F 13/28 |
| | | | | 710/24 |
| 2012/0151472 | A1 | 6/2012 | Koch et al. | |

(Continued)

OTHER PUBLICATIONS

Janene Ellefson, SSD Product Market Manager—PCIe, Micron Technology, "NVM Express: Unlock Your Solid State Drives Potential", Flash Memory Summit 2013, Santa Clara, CA, 114 pages.

(Continued)

*Primary Examiner* — Faisal M Zaman
(74) *Attorney, Agent, or Firm* — Brinks Gilson & Lione

(57) ABSTRACT

Systems and methods for fast execution of in-capsule commands are disclosed. NVM Express (NVMe) over fabrics is a standard in which a host device sends commands in a command capsule to a memory device. The memory device then saves the command capsule as an entry to a submission queue, and thereafter fetches the command capsule from the submission queue for execution. In certain instances, such as when the command capsule includes a write command, the memory device may decide to by-pass the submission queue and instead begin execution of the command without fetching the command from the submission queue. In these instances of bypassing, the memory device may instead insert a no-operation entry in the submission queue. Further, the memory device may send a response capsule prior to beginning execution of the command.

17 Claims, 12 Drawing Sheets

(56) References Cited

U.S. PATENT DOCUMENTS

| | | | |
|---|---|---|---|
| 2014/0181323 A1* | 6/2014 | Manula | G06F 3/0659 |
| | | | 710/5 |
| 2014/0281040 A1 | 9/2014 | Liu | |
| 2015/0127882 A1 | 5/2015 | Carlson et al. | |
| 2015/0254088 A1 | 9/2015 | Chou et al. | |
| 2015/0363229 A1* | 12/2015 | Wang | G06F 16/2453 |
| | | | 718/103 |
| 2016/0004438 A1 | 1/2016 | Moon et al. | |
| 2016/0062669 A1* | 3/2016 | Chu | G06F 3/0611 |
| | | | 711/103 |
| 2016/0077740 A1 | 3/2016 | Hussain et al. | |
| 2016/0085718 A1 | 3/2016 | Huang | |
| 2016/0140041 A1 | 5/2016 | Niu et al. | |
| 2016/0147442 A1 | 5/2016 | Baderdinni et al. | |
| 2016/0188510 A1 | 6/2016 | Singh et al. | |
| 2016/0239939 A1* | 8/2016 | Kakarlapudi | G06T 15/005 |
| 2016/0267016 A1 | 9/2016 | Lee et al. | |
| 2016/0292007 A1 | 10/2016 | Ding et al. | |
| 2016/0321012 A1 | 11/2016 | Clark et al. | |
| 2017/0060422 A1 | 3/2017 | Sharifie et al. | |
| 2017/0060749 A1 | 3/2017 | Segev et al. | |
| 2017/0075629 A1 | 3/2017 | Manohar et al. | |
| 2017/0075828 A1 | 3/2017 | Monji et al. | |
| 2017/0123659 A1 | 5/2017 | Nam et al. | |
| 2017/0177222 A1 | 6/2017 | Singh et al. | |
| 2017/0214762 A1* | 7/2017 | Swain | H04L 67/2842 |
| 2018/0285073 A1* | 10/2018 | Fukuchi | G06F 5/10 |
| 2019/0018805 A1* | 1/2019 | Benisty | G06F 13/1668 |

OTHER PUBLICATIONS

Kevin Marks, Dell, Inc., "An NVM Express Tutorial", Flash Memory Summit 2013, Santa Clara, CA, 92 pages.

Electronic unpublished U.S. Appl. No. 15/148,409 entitled "Systems and Methods for Processing a Submission Queue" filed May 6, 2016, pending, 66 pages.

Specification and Drawings of U.S. Appl. No. 15/457,676 entitled "Storage System and Method for Thermal Throttling via Command Arbitration" filed Mar. 13, 2017; 32 pages.

International Search Report and Written Opinion in Application No. PCT/US2018/019914 dated Jul. 13, 2018, 18 pages.

* cited by examiner

SYSTEM AND METHOD FOR FAST EXECUTION OF IN-CAPSULE COMMANDS

REFERENCE TO RELATED APPLICATION

This is a continuation-in-part application of U.S. application Ser. No. 15/468,620, filed on Mar. 24, 2017.

BACKGROUND

Non-Volatile Memory Express (NVMe) is a standard for accessing non-volatile storage media attached via PCI Express (PCIe) bus. NVMe may be used with a variety of non-volatile storage media, such as solid state drives (SSDs). An alternative implementation of NVMe is NVMe over Fabrics, which is a technology specification designed to enable NVMe message-based commands to transfer data between a host computer and a target solid-state storage device or system over a network, such as Ethernet, Fibre Channel, and InfiniBand.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements.

DETAILED DESCRIPTION OF EMBODIMENTS

Overview

NVMe over Fabrics builds on the architecture, command sets, and queuing interface defined in the NVMe base specification. In addition, NVMe over Fabrics modifies the NVMe base specification in several ways. As one example, instead of using a PCI express (PCIe) bus, a physical port that is a fabric (such as a fabric bus) is used. As another example, NVMe over Fabrics defines that all submission queues are implemented in the memory device and not in a host device memory. In this regard, the memory device does not fetch the commands from a submission queue resident in the host device. Instead, the memory device receives the commands directly from the host device using command capsules. After which, the memory device saves the command capsules onto the submission queues resident in the memory device. Thus, NVMe over Fabrics defines a common architecture and supports a range of storage networking fabrics for NVMe block storage protocol over a storage networking fabric. In this way, NVMe over Fabrics defines different functionality such as: enabling a front-side interface into storage systems; scaling to large numbers of NVMe devices; and extending the distance over which NVMe devices and NVMe subsystems can be accessed.

Various types of fabric transports for NVMe are contemplated including: NVMe over Fabrics using remote direct memory access (RDMA) (e.g., using various computer-networking communication standards, such as InfiniBand, RDMA over Converged Ethernet (RoCE) and iWARP); and NVMe over Fabrics using Fibre Channel (e.g., FC-NVMe).

Figure 5A:
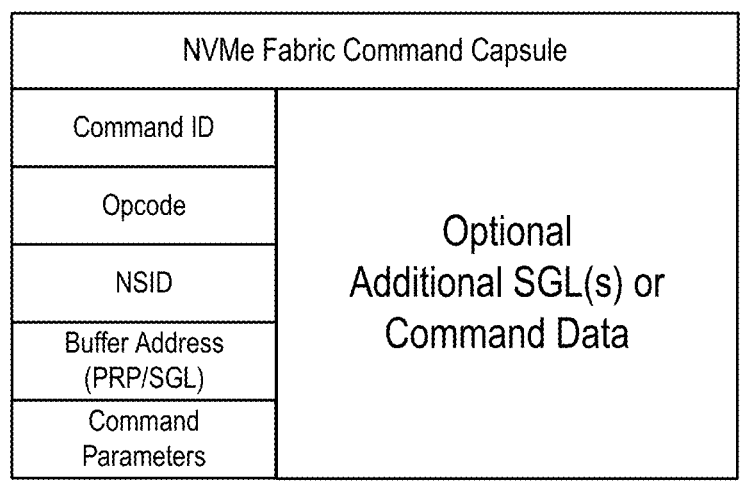
FIGS. 5A-B illustrate NVMe fabric capsules, including NVMe Fabric Command Capsule (FIG. 5A) and NVMe Fabric Response Capsule (FIG. 5B).
Figure 5B:
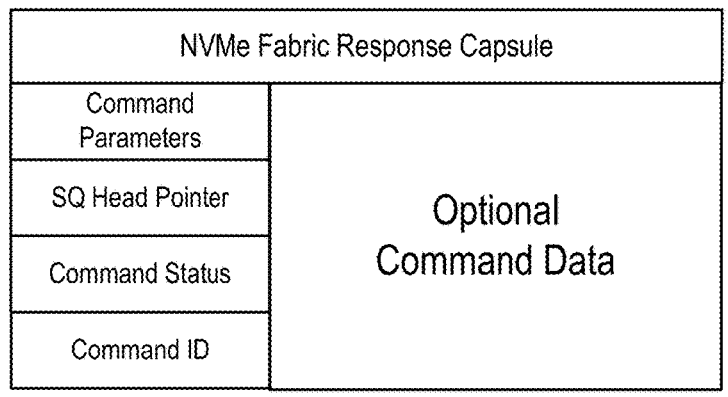

Command capsules may contain the command (such as a command operation to write to non-volatile memory) and may also contain other data associated with the command. For example, when sending complex messages to an NVMe over Fabrics memory device, the capsules allow multiple small messages to be sent as one message, which may improve the efficiency of transmission and reduce latency. The command capsule is a submission queue entry, and may include other data, such as write data, metadata or Scatter-Gather Lists (SGLs). The response capsule is a completion queue entry (which may be indicative of completion) and may contain additional information (e.g., data read from the non-volatile memory). In one implementation, SGLs may be used to perform data transfers of data that is written to noncontiguous areas of host device memory. Alternatively, SGLs may describe the structure of the data that will be transmitted in the response capsule (such as depicted in FIG. 5B, discussed below) and not in host device memory. For instance, an SGL may describe the offset from the start of the capsule and the size. In addition, SGLs may describe the structure of the data that is transmitted in the command capsule (e.g., for write commands). Thus, in NVMe over fabrics, the memory device performs fewer read operations since the command capsule includes the information to process the command (e.g., the write data).

In one implementation, the data sent to/from the memory device is the same according to NVMe over Fabrics as according to the NVMe base specification. However, the packaging of the data, such as the form of a capsule to package the data, is different according to NVMe over Fabrics. FIGS. 5A-B illustrate NVMe fabric capsules, including an example NVMe Fabric Command Capsule (FIG. 5A) and an example NVMe Fabric Response Capsule (FIG. 5B).

As shown in FIG. 5A, the NVMe Fabric Command Capsule received from the host device includes: a Command ID (which is a number that assists with the command sequence); an Opcode (which may include a type of command, such as a first Opcode for a write command and a second Opcode for read command); NSID (which is the NAND space ID and by which each command may be associated with a different NAND space); buffer address (which may indicate a buffer, such as a buffer resident on the host device in which to store read data); command parameters (which may comprise all of the parameters of the command, such as the Logical Block Address (LBA), the size of the command, etc.); and optional SGL(s) or command data.

As shown in FIG. 5B, the NVMe Fabric Response Capsule sent from the memory device to the host device includes: command parameters (which may comprise all of the parameters of the command, such as the size of the command, etc.); SQ head pointer (which is the pointer to the submission queue); command status (which is indicative of success/failure in executing the command); Command ID (which is the same number as in the NVMe Fabric Command Capsule); and Optional command data (which may include the data that is read from the non-volatile memory responsive to executing the command).

In NVMe over Fabrics, the memory device receives the NVMe Fabric Command Capsule, queues it in the relevant submission queue (SQ) and obtains the data that is stored in the command capsule buffers. For example, in the case of a write command, the memory device receives the NVMe write command along with the data to be written to non-volatile memory (also termed "write data") in a single capsule. In turn, the memory device stores the write data in buffers. Thus, for each entry or other indication of the command in the submission queues, a data buffer is used to store the write data. After which, the memory device controller fetches the commands from the submission queue. As discussed in more detail below, in determining which commands to fetch from the one or more submission queues, the memory device may use arbitration scheme(s), such as round-robin, weighted-round robin, etc. The command may thereafter begin execution only after fetching from the submission queue. In this regard, the write command may be deeply queued in the submission queue. So that, the resources associated with the write command, including the write data buffers, may be used for a longer time due to the delay in executing the write command.

In one implementation, the memory device determines whether or not to bypass the submission queue when executing a command, such as an NVMe over Fabrics in-capsule command. The determination whether or not to bypass the submission queue may be based on one or more aspects of the command. As one example, the determination may be based on the type of command, such as whether the command is a predetermined type, such as a write command. As discussed in more detail below, responsive to determining whether the command capsule matches and/or does not match a certain aspect, the command associated with the command capsule is not placed in the submission queue and is processed differently from commands placed in the submission queue. For example, responsive to determining that the command capsule is directed to a write command, the memory device determines not to place at least a certain part of the command capsule (such as the write data in the command capsule) in the submission queue. As discussed in more detail below, a no-operation command entry associated with the command may be placed in the submission queue. The write command is thus not subject to fetching, and the delays associated therewith.

In this way, the memory device may include a high performance path for NVMe in-capsule data commands. In this path, the write commands are not queued in the submission queues, but bypass this stage. The write data buffers may be forwarded immediately to the back-end for flushing the write data to the non-volatile memory and for re-using of the buffers more quickly. More specifically, the bypass avoids queuing the write commands (including the write data), which may consume DRAM space until the command is executed. Further, the size of the submission queue, which may be defined at initialization, may hold upwards of 64,000 commands. Processing of the commands in the submission queue may be based on FIFO. Thus, a write command, deeply queued, may result in the memory device's resources being wasted while other commands further up in the queue being processed.

Alternatively, or in an additional implementation, the memory device may generate a response capsule prior to beginning execution of the command. The memory device may analyze one or more factors in order to determine whether to generate the response capsule prior to beginning execution of the command. Any one, any combination, or all of the following example factors may be analyzed: the type of command; the integrity of the data; and the completeness of the capsule. Other factors are contemplated. Thus, after generating and sending the response capsule, the memory device may begin execution of the command.

As one example, the memory device may send the response capsule responsive to determining that the command is a certain type of command and/or is not a certain type of command. In particular, the memory device may send a response capsule responsive to determining that the command is a write command. Alternatively, the memory device may send a response capsule responsive to determining that the command is not a force unit access (FUA) command. As another example, the memory device may send the response capsule responsive to determining that the data (e.g., the write data) has a sufficient level of data integrity, as discussed in more detail below. As still another example, the memory device may send the response capsule responsive to determining that the in-capsule command includes all aspects to begin execution of the data. Alternatively, in a case where one or more of the factors are not met (e.g., in case of an error, such as in the write command or in the write data), the command is directed to the normal flow (e.g., queuing to submission queue, command fetching arbitration and etc.) and a normal sending of the response capsule. Thus, in a specific implementation, in parallel to bypassing the submission queue and executing the write command, the memory device may auto-complete the write command by generating a response capsule and posting the response capsule (e.g., indicating completion) to the fabric prior to beginning execution of the write command.

Various data integrity analyses are contemplated. As one example, the capsule may include a cyclic redundancy check (CRC), which may be used to detect errors in the write data. The data integrity check may be performed at various stages. In one implementation, the data integrity check is performed before storing the write data in DRAM. In an alternate implementation, the data integrity check is performed after storing the write data in DRAM. If the data integrity check is performed before storing the write data in DRAM, the memory device may perform the data integrity check when the data is stored in a temporal storage buffer (e.g., SRAM or internal flops). Alternatively, in the case that the memory device does not include DRAM, the memory device may perform the data integrity check when the data is stored in the temporal storage buffer.

In another implementation, the memory device determines whether or not to place a no-operation command entry in one or more submission queues. As discussed above, in NVMe over Fabrics, the memory device is responsible for placing the command entries in the submission queue. Under certain circumstances, the memory device may place the no-operation command entry, which is indicative to perform no operation. As discussed above, the memory device may determine whether to bypass the submission queue when executing a command. In response to determining to bypass the submission queue, the memory device may place a no-operation command entry in the submission queue with one or more indicators of the command (e.g., the no-operation command entry may include the command ID of the command capsule). In this way, even though the submission queue is bypassed for purposes of execution of the command capsule, the submission queue and the associated completion queue have an entry indicative of the command capsule for purposes of managing the command capsules. Further, when the no-operation command is eventually fetched from the submission queue, the memory device may review the command and determine not to perform any action (e.g., the memory device ignoring the no-operation command). After execution of the command (such as the write command) that is associated with the no-operation command, the memory device may post a completion entry for this command on the completion queue. For example, the memory device may receive a write command with command ID #XYZ. The memory device may determine to bypass the submission queue when executing the command (with command ID #XYZ), instead inserting a no-operation command in the submission queue (with command ID #XYZ). Though, including the command ID# is not necessary for the submission queue entry. As discussed below, even before beginning execution of the write command with command ID #XYZ, the memory device may post an entry to the completion queue, with the entry having command ID #XYZ. In this way, the no-operation command is queued to the relevant submission queue so the host device and memory device pointers are aligned. Specifically, the no-operation command entry in practice may be considered a dummy entry used to sync the submission queue with the completion queue.

Embodiments

The following embodiments describe non-volatile memory devices and related methods for processing of commands. Before turning to these and other embodiments, the following paragraphs provide a discussion of exemplary non-volatile memory devices and storage modules that can be used with these embodiments. Of course, these are just examples, and other suitable types of non-volatile memory devices and/or storage modules can be used.

Figure 1A:
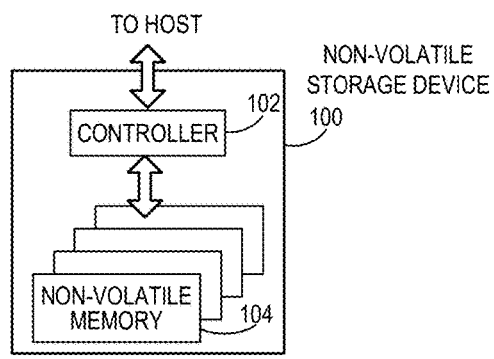
FIG. 1A is a block diagram of an exemplary non-volatile memory system.

FIG. 1A is a block diagram illustrating a non-volatile memory device 100. The non-volatile memory device 100 may include a controller 102 and non-volatile memory that may be made up of one or more non-volatile memory dies 104. As used herein, the term die refers to the set of non-volatile memory cells, and associated circuitry for managing the physical operation of those non-volatile memory cells, that are formed on a single semiconductor substrate. The controller 102 may interface with a host device or a host system and transmit command sequences for read, program, and erase operations to the non-volatile memory die(s) 104. As discussed below, the commands may include logical and/or physical addresses.

The controller 102 (which may be a flash memory controller) can take the form of processing circuitry, a microprocessor or processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a flash memory controller is a device that manages data stored on flash memory and communicates with a host, such as a computer or electronic device. A flash memory controller can have various functionality in addition to the specific functionality described herein. For example, the flash memory controller can format the flash memory to ensure the memory is operating properly, map out bad flash memory cells, and allocate spare cells to be substituted for future failed cells. Some part of the spare cells can be used to hold firmware to operate the flash memory controller and implement other features. One example of the firmware is a flash translation layer. In operation, when a host device needs to read data from or write data to the flash memory, it will communicate with the flash memory controller. In one embodiment, if the host device provides a logical address to which data is to be read/written, the flash memory controller can convert the logical address received from the host to a physical address in the flash memory. The flash memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

The interface between the controller 102 and the non-volatile memory die(s) 104 may be any suitable flash interface, such as Toggle Mode 200, 400, or 800. In one embodiment, the memory device 100 may be a card based system, such as a secure digital (SD) or a micro secure digital (micro-SD) card. In an alternate embodiment, the non-volatile memory device 100 may be part of an embedded memory device.

Although in the example illustrated in FIG. 1A, the non-volatile memory device 100 may include a single channel between the controller 102 and the non-volatile memory die(s) 104, the subject matter described herein is not limited to having a single memory channel. For example, in some NAND memory device architectures, 2, 4, 8 or more NAND channels may exist between the controller and the NAND memory die(s) 104, depending on controller capabilities. In any of the embodiments described herein, more than a single channel may exist between the controller and the memory die(s) 104, even if a single channel is shown in the drawings.

Figure 1B:
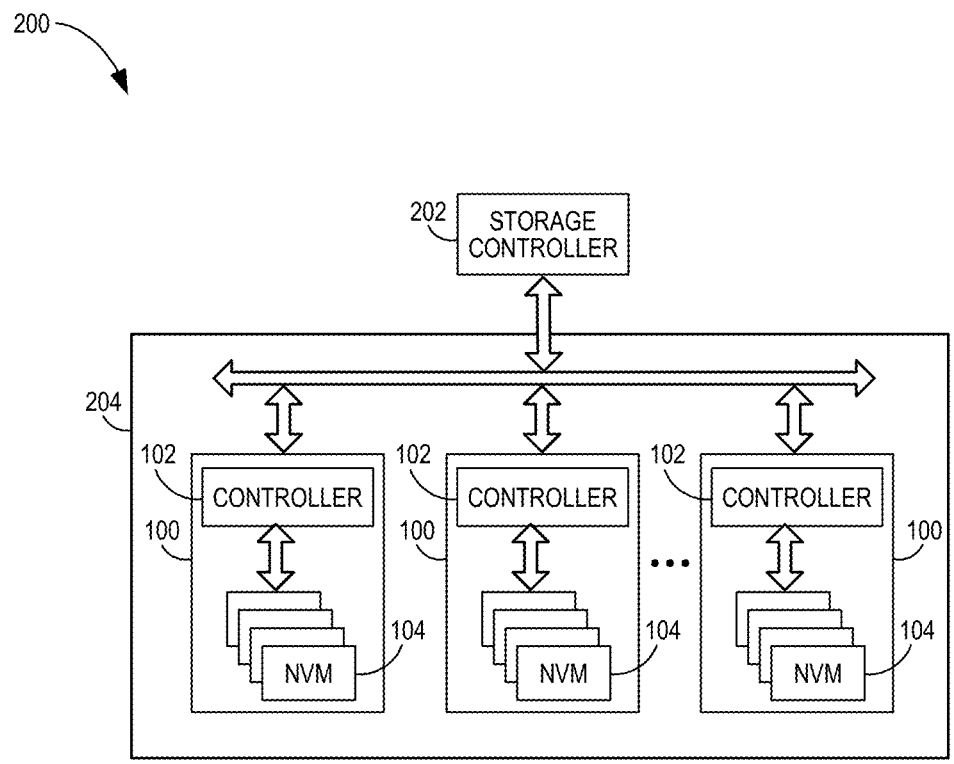
FIG. 1B is a block diagram of a storage module that includes a plurality of non-volatile memory systems and a host.

FIG. 1B illustrates a storage module 200 that includes plural non-volatile memory devices 100. As such, the storage module 200 may include a storage controller 202 that interfaces with a host 220 and with a storage system 204, which includes a plurality of non-volatile memory devices 100. The interface between the storage controller 202 and non-volatile memory devices 100 may be a bus interface, such as a serial advanced technology attachment (SATA), a peripheral component interface express (PCIe) interface, an embedded MultiMediaCard (eMMC) interface, a SD interface, a Universal Serial Bus (USB) interface, or a fabric transport interface, as examples. The storage system 200, in one embodiment, may be a solid state drive (SSD), such as found in portable computing devices, such as laptop computers and tablet computers, and mobile phones.

Figure 1C:
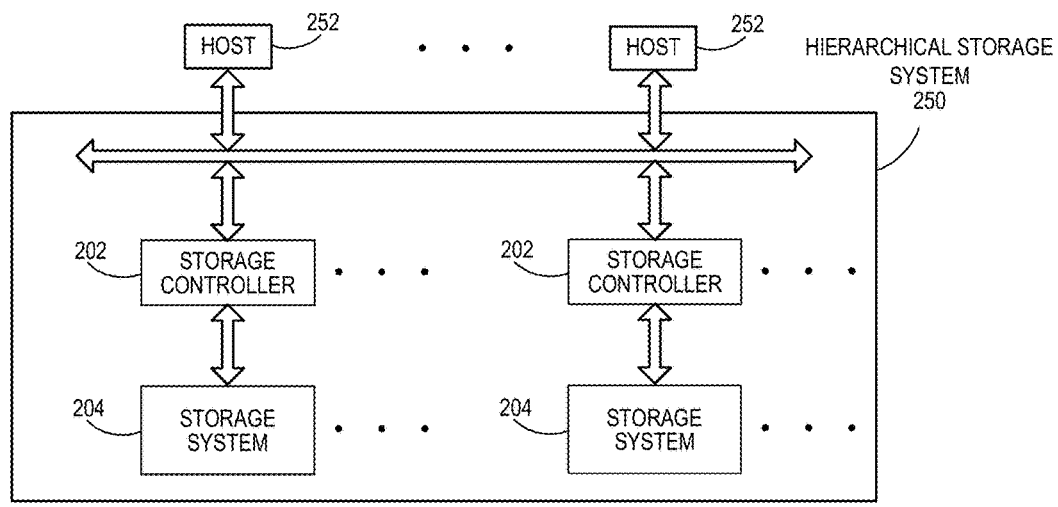
FIG. 1C is a block diagram of a hierarchical storage system.

FIG. 1C is a block diagram illustrating a hierarchical storage system 250. The hierarchical storage system 250 may include a plurality of storage controllers 202, each of which control a respective storage system 204. Host systems 252 may access memories within the hierarchical storage system 250 via a bus interface. Example bus interfaces may include a non-volatile memory express (NVMe), a fiber channel over Ethernet (FCoE) interface, an SD interface, a USB interface, a SATA interface, a PCIe interface, or an eMMC interface as examples. In one embodiment, the hierarchical storage system 250 illustrated in FIG. 1C may be a rack mountable mass storage system that is accessible by multiple host computers, such as would be found in a data center or other location where mass storage is needed. In one embodiment, host systems 252 may include the functionality described in host 220.

Figure 2A:
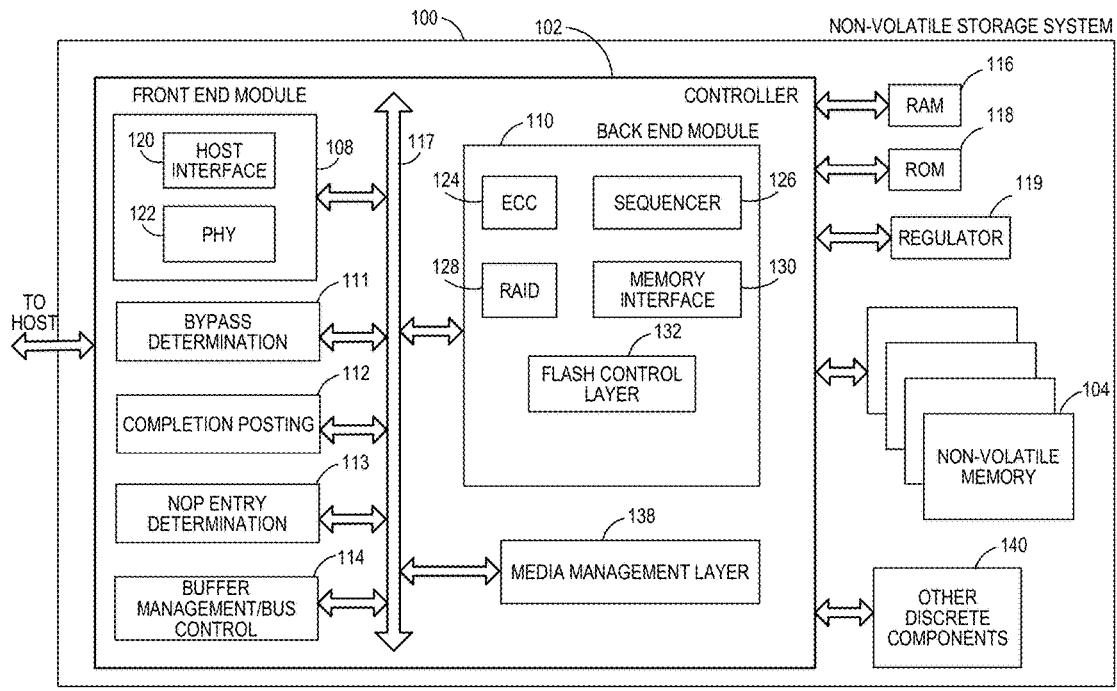
FIG. 2A is a block diagram of exemplary components of a controller of the non-volatile memory system of FIG. 1A.

FIG. 2A is a block diagram illustrating exemplary components of the controller 102 in more detail. The controller 102 may include a front end module 108 that interfaces with a host, a back end module 110 that interfaces with the non-volatile memory die(s) 104, and various other modules that perform various functions of the non-volatile memory device 100. In general, a module may be hardware or a combination of hardware and software. For example, each module may include an application specific integrated circuit (ASIC), a field programmable gate array (FPGA), a circuit, a digital logic circuit, an analog circuit, a combination of discrete circuits, gates, or any other type of hardware or combination thereof. In addition or alternatively, each module may include memory hardware that comprises instructions executable with a processor or processor circuitry to implement one or more of the features of the module. When any one of the module includes the portion of the memory that comprises instructions executable with the processor, the module may or may not include the processor. In some examples, each module may just be the portion of the memory that comprises instructions executable with the processor to implement the features of the corresponding module without the module including any other hardware. Because each module includes at least some hardware even when the included hardware comprises software, each module may be interchangeably referred to as a hardware module.

The controller 102 may include a buffer manager/bus control module 114 that manages buffers in random access memory (RAM) 116 and controls the internal bus arbitration for communication on an internal communications bus 117 of the controller 102. A read only memory (ROM) 118 may store and/or access system boot code. Although illustrated in FIG. 2A as located separately from the controller 102, in other embodiments one or both of the RAM 116 and the ROM 118 may be located within the controller 102. In yet other embodiments, portions of RAM 116 and ROM 118 may be located both within the controller 102 and outside the controller 102. Further, in some implementations, the controller 102, the RAM 116, and the ROM 118 may be located on separate semiconductor dies. As discussed below, in one implementation, the submission queues and the completion queues may be stored in the Controller Memory Buffer, which may be housed in RAM 116.

Additionally, the front end module 108 may include a host interface 120 and a physical layer interface (PHY) 122 that provide the electrical interface with the host or next level storage controller. The choice of the type of the host interface 120 can depend on the type of memory being used. Examples types of the host interface 120 may include, but are not limited to, SATA, SATA Express, SAS, Fibre Channel, USB, PCIe, and NVMe. The host interface 120 may typically facilitate transfer for data, control signals, and timing signals.

The back end module 110 may include an error correction controller (ECC) engine 124 that encodes the data bytes received from the host, and decodes and error corrects the data bytes read from the non-volatile memory die(s) 104. As discussed in more detail below, the ECC engine may be tunable, such as to generate different amounts of ECC data based on the mode (e.g., generate normal mode ECC data in normal programming mode and generate burst mode ECC data in burst programming mode, with the burst mode ECC data being greater than the normal mode ECC data). The back end module 110 may also include a command sequencer 126 that generates command sequences, such as program, read, and erase command sequences, to be transmitted to the non-volatile memory die(s) 104. Additionally, the back end module 110 may include a RAID (Redundant Array of Independent Drives) module 128 that manages generation of RAID parity and recovery of failed data. The RAID parity may be used as an additional level of integrity protection for the data being written into the non-volatile memory device 100. In some cases, the RAID module 128 may be a part of the ECC engine 124. A memory interface 130 provides the command sequences to the non-volatile memory die(s) 104 and receives status information from the non-volatile memory die(s) 104. Along with the command sequences and status information, data to be programmed into and read from the non-volatile memory die(s) 104 may be communicated through the memory interface 130. In one embodiment, the memory interface 130 may be a double data rate (DDR) interface, such as a Toggle Mode 200, 400, or 800 interface. A flash control layer 132 may control the overall operation of back end module 110.

Thus, the controller 102 may include one or more management tables for managing operations of storage system 100. One type of management table includes logical-to-physical address mapping table. The size of logical-to-physical address mapping table may grow with memory size. In this regard, the logical-to-physical address mapping table for high capacity storage device (e.g., greater than 32 G) may be too large to store in SRAM, are may be stored in non-volatile memory 104 along with user and host data. Therefore, accesses to non-volatile memory 104 may first require reading the logical-to-physical address mapping table from non-volatile memory 104.

Additional modules of the non-volatile memory device 100 illustrated in FIG. 2A may include a media management layer 138, which performs wear leveling of memory cells of the non-volatile memory die 104. The non-volatile memory device 100 may also include other discrete components 140, such as external electrical interfaces, external RAM, resistors, capacitors, or other components that may interface with controller 102. In alternative embodiments, one or more of the RAID module 128, media management layer 138 and buffer management/bus controller 114 are optional components that may not be necessary in the controller 102.

Another module of the non-volatile memory device 100 illustrated in FIG. 2A may include bypass determination 111, completion posting 112 and NOP entry determination 113. As discussed in more detail below, the memory device may use bypass determination 111 in order to determine whether to bypass queuing of a command in the submission queue for purposes of execution, instead executing the command without fetching the command from the submission queue. Further, the memory device may use completion posting 112 in order to determine whether to send a completion message, such as the NVMe fabric response capsule, prior to beginning execution of the command. In addition, the memory device may use NOP entry determination 113 in order to determine whether to post a no-operation entry in the submission queue.

Figure 2B:
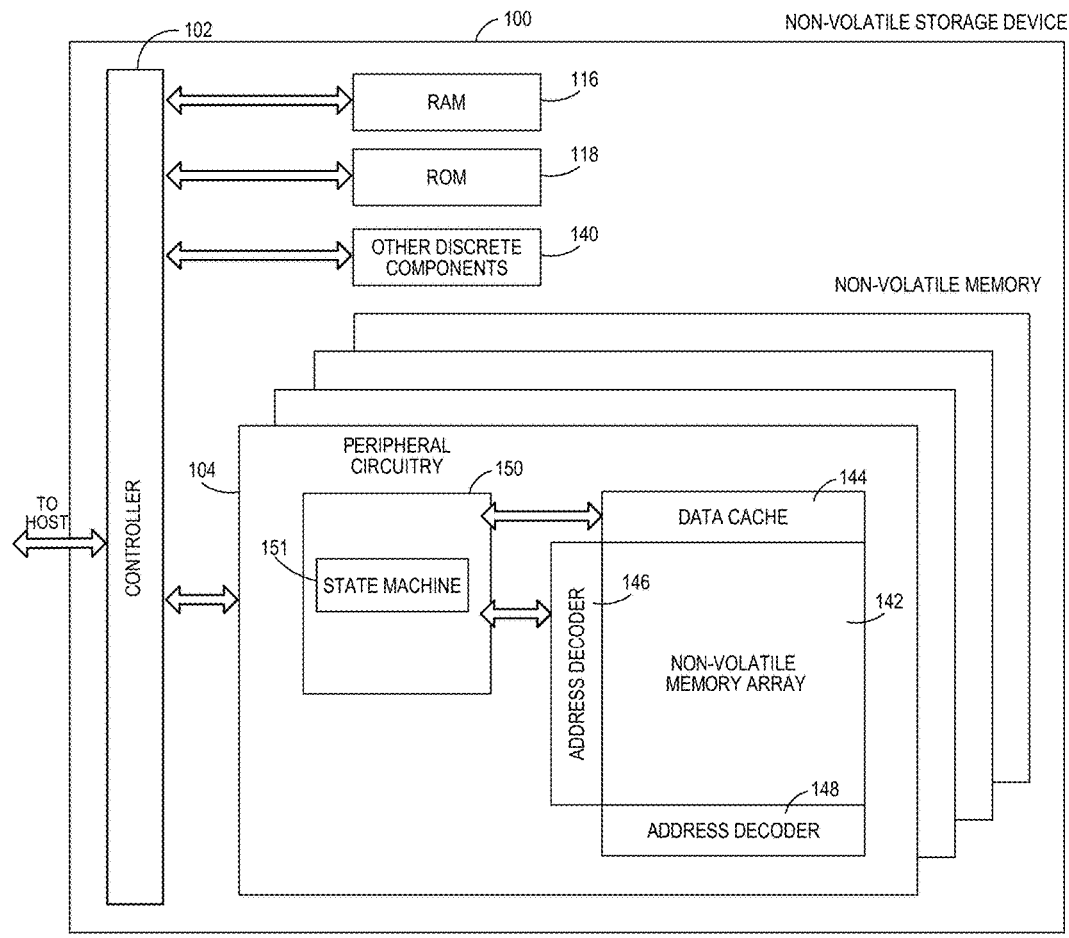
FIG. 2B is a block diagram of exemplary components of a non-volatile memory die of the non-volatile memory system of FIG. 1A.

FIG. 2B is a block diagram illustrating exemplary components of a non-volatile memory die 104 in more detail. The non-volatile memory die 104 may include a non-volatile memory array 142. The non-volatile memory array 142 may include a plurality of non-volatile memory elements or cells, each configured to store one or more bits of data. The non-volatile memory elements or cells may be any suitable non-volatile memory cells, including NAND flash memory cells and/or NOR flash memory cells in a two dimensional and/or three dimensional configuration. The memory cells may take the form of solid-state (e.g., flash) memory cells and can be one-time programmable, few-time programmable, or many-time programmable. In addition, the memory elements or cells may be configured as single-level cells (SLCs) that store a single bit of data per cell, multi-level cells (MLCs) that store multiple bits of data per cell, or combinations thereof. For some example configurations, the multi-level cells (MLCs) may include triple-level cells (TLCs) that store three bits of data per cell.

Additionally, a flash memory cell may include in the array 142 a floating gate transistor (FGT) that has a floating gate and a control gate. The floating gate is surrounded by an insulator or insulating material that helps retain charge in the floating gate. The presence or absence of charges inside the floating gate may cause a shift in a threshold voltage of the FGT, which is used to distinguish logic levels. That is, each FGT's threshold voltage may be indicative of the data stored in the memory cell. Hereafter, FGT, memory element and memory cell may be used interchangeably to refer to the same physical entity.

The memory cells may be disposed in the memory array 142 in accordance with a matrix-like structure of rows and columns of memory cells. At the intersection of a row and a column is a FGT (or memory cell). A column of FGTs may be referred to as a string. FGTs in a string or column may be electrically connected in series. A row of FGTs may be referred to as a page. Control gates of FGTs in a page or row may be electrically connected together.

The memory array 142 may also include wordlines and bitlines connected to the FGTs. Each page of FGTs is coupled to a wordline. In particular, each wordline may be coupled to the control gates of FGTs in a page. In addition, each string of FGTs may be coupled to a bitline. Further, a single string may span across multiple wordlines, and the number of FGTs in a string may be equal to the number of pages in a block.

The non-volatile memory die 104 may further include a page buffer or data cache 144 that caches data that is sensed from and/or that is to be programmed to the memory array 142. The non-volatile memory die 104 may also include a row address decoder 146 and a column address decoder 148. The row address decoder 146 may decode a row address and select a particular wordline in the memory array 142 when reading or writing data to/from the memory cells in the memory array 142. The column address decoder 148 may decode a column address to select a particular group of bitlines in the memory array 142 to be electrically coupled to the data cache 144.

In addition, the non-volatile memory die 104 may include peripheral circuitry 150. The peripheral circuitry 150 may include a state machine 151 that provides status information to the controller 102. Other functionality of the state machine 151 is described in further detail below.

Figure 3:
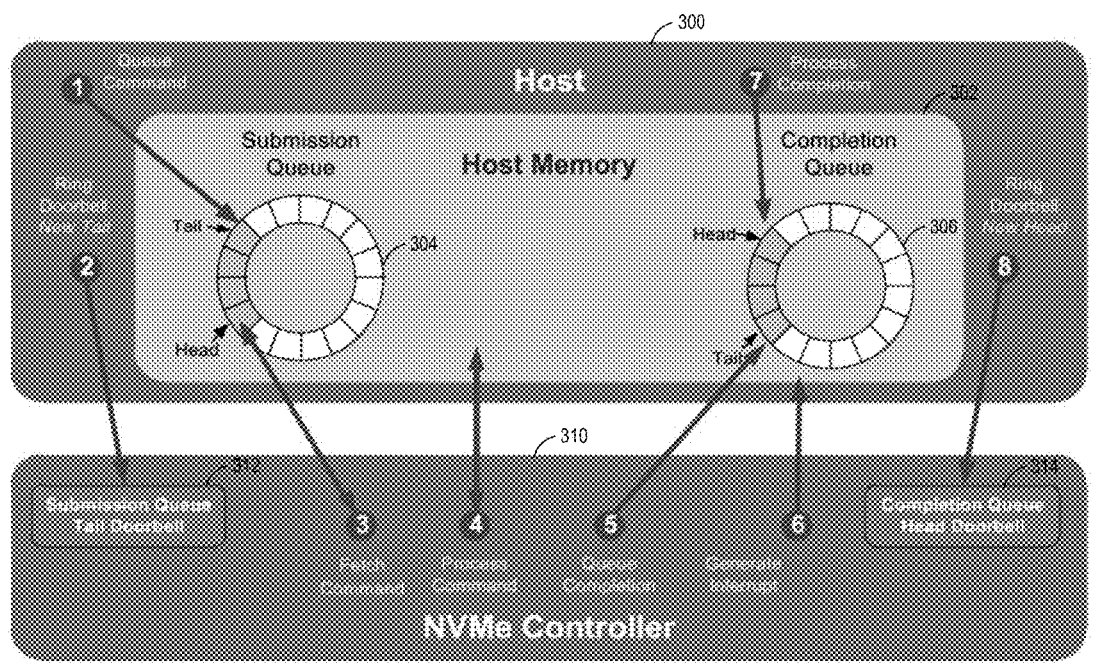
FIG. 3 is a block diagram of the host device and NVMe controller illustrating a sequence for a host device and a memory device to request and process an NVMe command.

As discussed above, NVMe over Fabrics uses some aspects of the NVMe standard. In that regard, FIG. 3 is used to illustrate a sequence of steps for executing a command via the NVMe standard, with changes to the NVMe standard when using NVMe over Fabrics highlighted. The NVMe standard discloses a scalable host controller interface designed to address the needs of Enterprise and Client systems that utilize PCI Express-based solid state drives. Such systems are based on a paired submission queue and completion queue mechanism.

As shown in FIG. 3, the host device 300 includes host memory 302, and the memory device includes a controller, such as an NVMe controller 310. In the implementation illustrated in FIG. 3, the host memory 302 includes a submission queue 304 and a completion queue 306. In contrast, NVMe over fabrics has the submission queue and completion queue resident in the memory device, such as in a controller memory buffer. Further, in one implementation, the submission queues and completion queues may have a 1:1 correlation. Alternatively, the submission queues and completion queues do not have a 1:1 correlation.

In practice, at the initialization phase, the host device 300 may instruct the memory device to create the submission queue(s) and corresponding completion queue(s) in a memory resident in the memory device, such as a controller memory buffer.

The submission queue 304 and completion queue 306 may be based on a ring buffer, with a head pointer and a tail pointer. In one implementation, the submission queue and completion queue are circular buffers with fixed slot sizes, such as 64 Bytes for submission queues and 16 Bytes for completion queues. For example, a host device may have up to 64K outstanding commands to a submission queue.

After the submission queue(s) are created, the host device 300 may write a command (or several commands) to the submission queue. This is indicated in FIG. 3 as step 1, labeled "Queue Command". In particular, FIG. 3 illustrates that four commands were written to the submission queue. In step 2, the host device 300 writes to a submission queue tail doorbell register 312 in the memory device. This writing to the submission queue tail doorbell register 312 signifies to the memory device that the host device has queued one or more commands in this specific submission queue 304 (e.g., 4 commands as illustrated in FIG. 3). In contrast, in NVMe over Fabrics, the host device sends command capsule that includes the command and data associated with the command. After which, the memory device writes the command to the submission queue. In this regard, steps 1 and 2 as outlined in FIG. 3 are not performed in NVMe over Fabrics.

In the general case, there may be several submission queues (with potentially many pending commands in the several submission queues). Thus, before performing step 3, the memory device controller may arbitrate between the various submission queues to select the particular submission queue from which to fetch the command(s). In this regard, the memory device may consider a single submission queue, alone, in deciding whether to fetch commands from that single submission queue. Alternatively, the memory device may consider multiple submission queues, in combination, in deciding whether to fetch commands from the multiple submission queues.

Responsive to determining which particular submission queue 304 from which to fetch the command(s), at step 3, the memory device fetches the command(s) from the particular submission queue 304. In practice, the memory device may use one or more arbitration schemes, such as round-robin, weighted round robin, etc. in order to determine which commands to fetch from the submission queue(s). Discussion of various arbitration schemes are disclosed in U.S. patent application Ser. No. 15/585,717, incorporated by reference herein in its entirety. Further, the memory device may access the base address of the particular submission queue 304 plus the pointer on the current head pointer implemented in the host device 300.

At step 4, the memory device processes the command. In one implementation, the memory device parses the commands, and determines the steps to execute the commands (e.g., read/write/etc.). For example, the command may comprise a read command. In the NVMe base specification, responsive to receipt of the read command, the memory device parses the read command, implements the address translation, and accesses the flash to receive the data. After receiving the data, the memory device may perform error correction on the data accessed from flash. Thereafter, the memory device may cause the error-corrected data to be stored on the host device based on information in the command (e.g., the PRP1 discussed below). In particular, the PRP1 may define the location (e.g., the address range) of the host command data buffer that resides on the host. In contrast, in NVMe over Fabrics, the NVMe Fabric command capsule may include the data that was read from flash memory. As another example, the command may comprise a write command. In the NVMe base specification, responsive to receipt of the write command, the memory device parses the write command, determines the location of the data on the host device subject to the write, reads the data from the location on the host device, and writes the data to flash memory. In contrast, in NVMe over Fabrics, the NVMe Fabric command capsule may include the data to be written to flash memory.

After completing the data transfer, at step 5, the memory device controller sends a completion message to the relevant completion queue 306. The completion message may contain information as to the processing of the command(s), such as whether the command was completed successfully or whether there was an error when executing the command.

After step 5, the host device 300 is unaware that the memory device posted to the completion queue 306. This is due to the memory device causing data to be written to the completion queue 306. In that regard, at step 6, the memory device notifies the host device 300 that there has been an update to the completion queue 306. In particular, the memory device posts an interrupt to the host device 300 (e.g., in NVMe, the host device 300 may use an MSIe interrupt). The interrupt indicates to the host device that there is an entry on the completion queue 306. As discussed in more detail below, in one implementation, the memory device may use the host command data buffer until the memory device notifies the host device at step 6 that there has been an update to the completion queue 306.

Responsive to receiving the interrupt, the host device 300 determines that there are one or more completion entries pending for the host device 300 in this completion queue 306. At step 7, the host device 300 then processes the entries in the completion queue 306. In contrast, in NVMe over Fabrics, the memory device sends the NVMe Fabric Response Capsule, indicating the response to the host command.

After the host processes the entries from the completion queue 306, at step 8, the host device 300 notifies the memory device of the entries that the host device 300 processed from the completion queue 306. This may be performed by updating a completion queue head doorbell register 314 indicative to the memory device that the host device 300 processed one or more entries from the completion queue 306.

Responsive to updating the completion queue head doorbell register 314, the memory device updates the head of the completion queue 306. Given the new head, the memory device is aware as to which entries in the completion queue 306 have already been processed by the host device 300 and may be overwritten.

Figure 4:
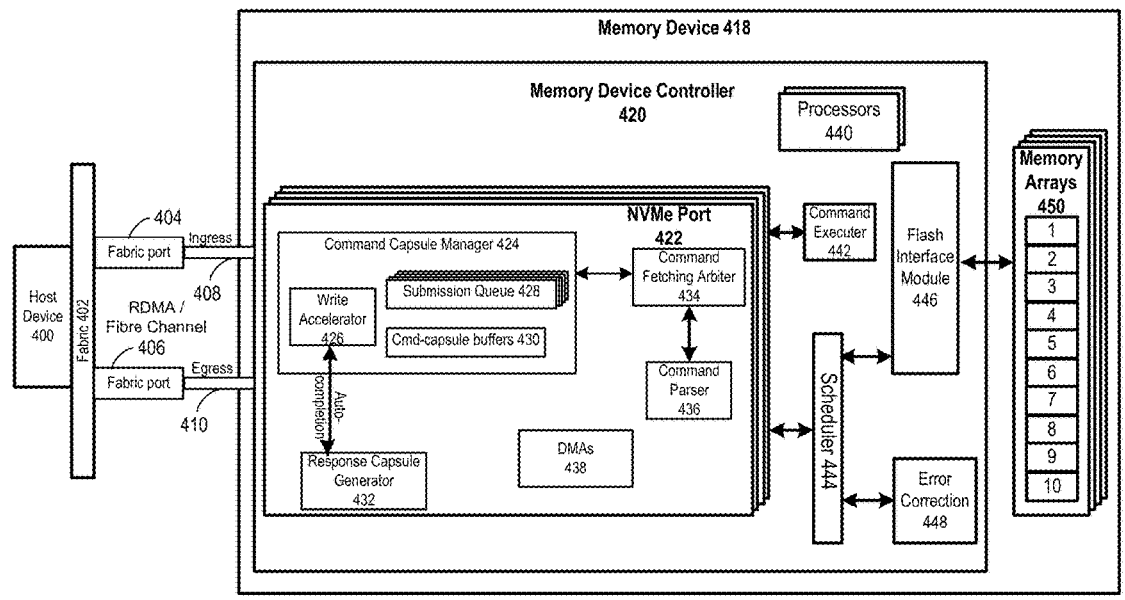
FIG. 4 is one example of a block diagram of exemplary components of host device, memory device and the fabric communication interface.

FIG. 4 is one example of a block diagram of exemplary components of host device 400, memory device 418 and the fabric communication interface. The host device 400 interfaces with fabric 402, which in turn includes fabric ports 404 and 406, that act as ingress path 408 and egress path 410, respectively. In this regard, the communication interface between the host device 400 and the memory device 418 is duplex, with a separate ingress path 408 and a separate egress path 410. The ingress path 408, from the perspective of the memory device 418, includes incoming requests from the host device 400 to the memory device 418. Conversely, the egress path 410, from the perspective of the memory device 418, includes outgoing requests from the memory device 418 to the host device 400. Further, there are a variety of fabrics which may be used, such as RDMA or a Fibre Channel, as discussed above.

Memory device 418 includes the memory device controller 420 and memory arrays 450. Memory arrays 450 may be segmented in various ways, such as in 10 sections as illustrated in FIG. 4. The memory device controller 420 may include one or more processors 440. Flash interface module 446 is configured to control and access the memory arrays 450. The memory device controller 420 may further include error correction 448. Various types of error correction are contemplated including linear error correcting code (e.g., low-density parity-check (LDPC)). Scheduler 444 is configured to schedule one or more types of data transfers. As one example, read data may arrive via the flash interface module 446 from different memory arrays 450 in parallel. Scheduler 444 may arbitrate from amongst the different data transfers.

Memory device controller 420 may include a single or multiple NVMe ports 422. Each port may implement the command and command capsule managers 424 which are responsible for interacting with fabric capsules. The NVMe port 422 may also contain the command fetching arbiter 434, the command parser 436, and DMAs 438. Command parser 436 is configured to parse and/or classify commands. Command fetcher arbiter 434, which may use the command parser 436, is configured to arbitrate as to which commands to fetch from the submission queue(s) 428. Command executer 442 is configured to arbitrate and execute the commands that were fetched from the submission queue(s) 428 by command fetch arbiter 434. Direct Memory Access (DMA) 438 is configured to perform the actual data transfer between host device 400 and memory device 418.

Command capsule manager 424 may implement the submission queue(s) 428 and the command-capsule buffers 430. In one implementation, the command-capsule buffers 430 store data associated with the command capsules, such as the SGL and data associated with a submission queue. Further, the command capsule manager 424 may include write accelerator 426. Write accelerator 426 may comprise logic at the entrance to the command capsule manager 424 that directs certain commands to a high-performance path. For example, write accelerator 426 may route write commands that have in-capsule data to the high performance path rather than sending the write commands to the submission queue 428 for subsequent fetching. In this regard, the write accelerator 426 includes intelligence to determine which commands to queue in the submission queue (for later fetching/execution) and which commands not to queue in the submission queue (e.g. insert a no-operation command and execute the command without fetching from the submission queue).

NVMe Port 422 may further include response capsule generator 432. Response capsule generator 432 may be configured to generate a response capsule and post the response capsule immediately (e.g., before execution of the command) to the host device 400 when no error is detected since all the information to execute the command is held internally. Response capsule generator 432 may generate the response capsule immediately under certain circumstances, such as only when a caching operation is allowed. In this implementation, the command-capsule buffers 430 may be directly provided to the back-end (e.g., outside of NVMe Port 422) so that the command-capsule buffers 430 may be reused for other purposes as fast as possible.

Thus, the write accelerator 426 may process a write buffer (that contains the write data) rather than queuing/processing write commands. In particular, the write accelerator 426 is configured to identify the command as a write command (and/or not an FUA command), perform the data integrity check of the data in the capsule, determine whether the capsule includes all of the data necessary to process this command, signal the response capsule generator 432 to send the response capsule, and command the write of the data from buffers (e.g., temporary buffers or DRAM) to other memory (e.g., non-volatile memory such as NAND memory).

Further, FIG. 4 illustrates multiple NVMe ports 422. In one implementation, a single NVMe port 422 is resident on memory device 218. In an alternate implementation, multiple NVMe ports 422 are resident on memory device 218. Further, in one implementation, each fabric ingress/egress is assigned to a different NVMe port 422. Alternatively, a fabric ingress/egress may be assigned to multiple NVMe ports 422.

Figure 6:
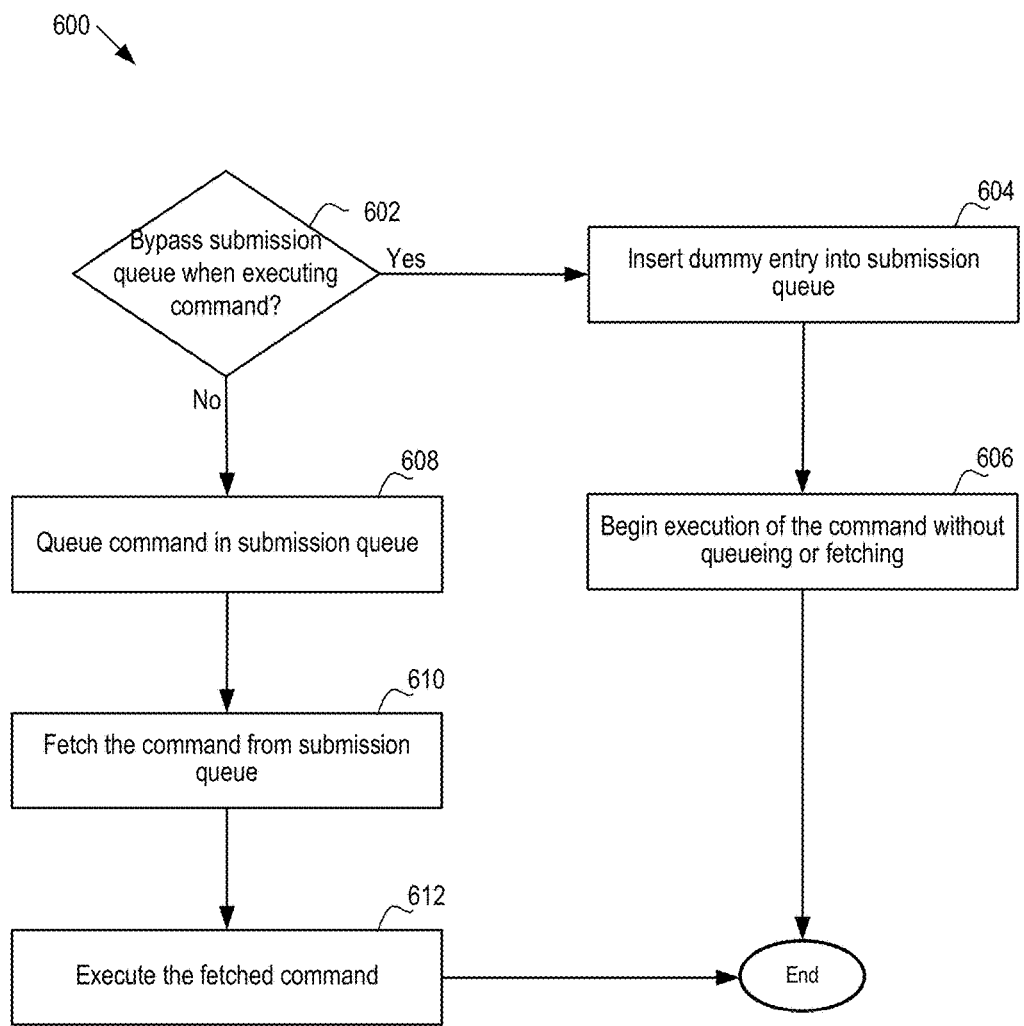
FIG. 6 is a flow chart of the memory device determining whether to bypass the submission queue when executing a command.

FIG. 6 is a flow chart 600 of the memory device determining whether to bypass the submission queue when executing a command. As discussed above, the memory device may queue a first set of commands in the submission queue(s), and thereafter fetch the commands for execution. The memory device may also bypass the submission queue(s) for a second set of commands whereby execution is performed without queuing and/or fetching from the submission queue(s). At 602, the memory device determines whether to bypass the submission queue when executing a command. As one example, the memory device may analyze one or more aspects of the command in determining whether to bypass the submission queue. In particular, the memory device may analyze the type of command (e.g., whether the command is a write command) in determining whether to bypass the submission queue. In response to determining to bypass the submission queue, at 604, the memory device may insert a no-operation entry or dummy entry into the submission queue. The command fetching arbiter 434 may review the no-operation entry and determine that the no-operation entry is indicative of performing no-operation. As such, the command executer 442 does not execute the no-operation entry. Further, at 606, the command executer 442 may begin execution of the command without queuing the command in the submission queue or fetching the command from the submission queue. Alternatively, in response to determining not to bypass the submission queue, at 604, the memory device queues the command in a submission queue. Thereafter, at 610, after arbitration, the memory device fetches the command from the submission queue, and at 612, executes the fetched command.

Thus, the no-operation or dummy submission queue entry may be used so that the host device and the memory device submission queue pointers remain aligned. When posting a completion queue entry, the memory device indicates to the host device the current HEAD pointer of the relevant submission queue. Therefore, by adding the no-operation or dummy entry, when posting any completion queue entry, the relevant submission queue head pointer is correct. Further, the logic that is responsible for submission queue fetching is configured to identify the no-operation or dummy entry and to discard the no-operation or dummy entry (e.g., perform no operation in response to identifying the no-operation or dummy entry).

Figure 7:
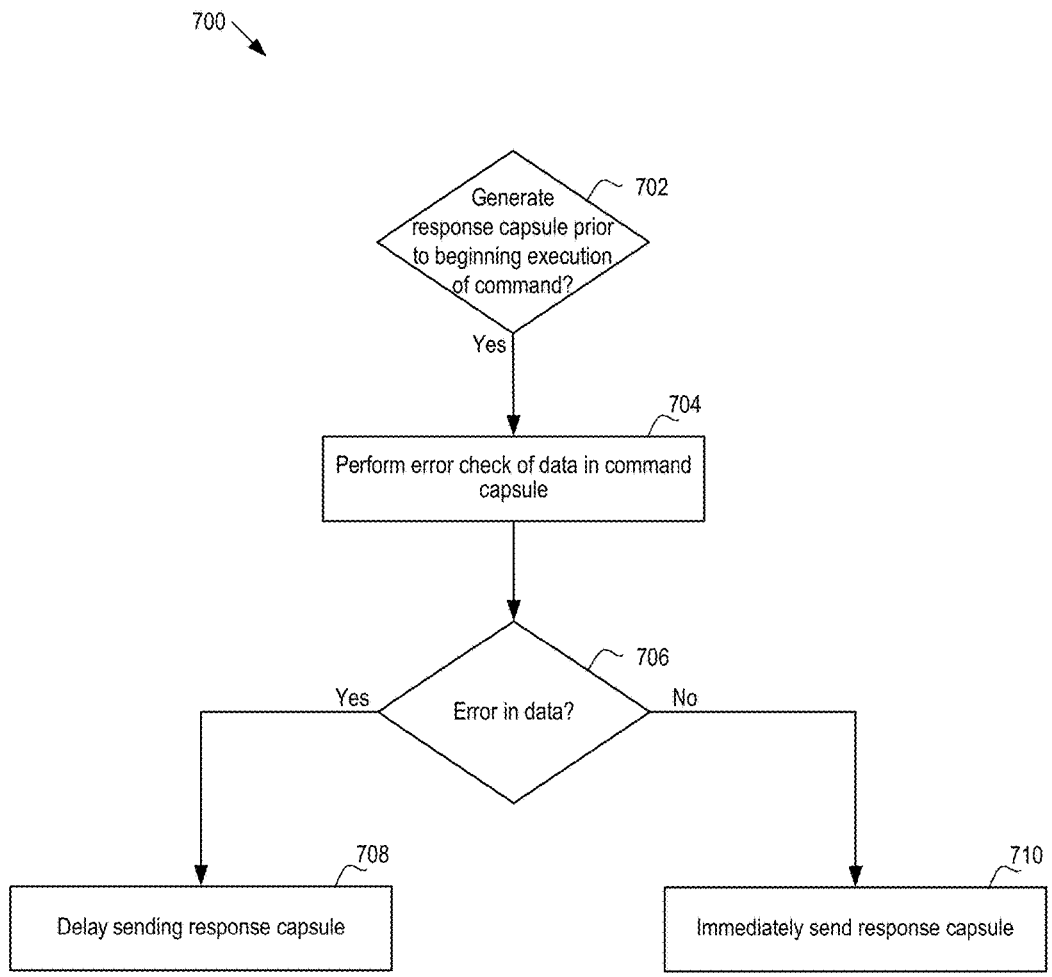
FIG. 7 is a flow chart of the memory device determining whether to delay or immediately send the response capsule.

FIG. 7 is a flow chart 700 of the memory device determining whether to delay or immediately send the response capsule. As discussed above, the response capsule may be sent at various times, such as before or after beginning execution of the command. At 702, the memory device determines whether to generate the response capsule prior to beginning execution of the command. If so, the memory device may analyze one or more aspects of the command. For example, at 704, the memory device may perform an error check of the data in the command capsule. At 706, the memory device then determines whether there is an error in the data. If so, at 708, the memory device delays sending the response capsule. If not, at 710, the memory device may immediately send the response capsule (such as before beginning execution of the command).

Figure 8:
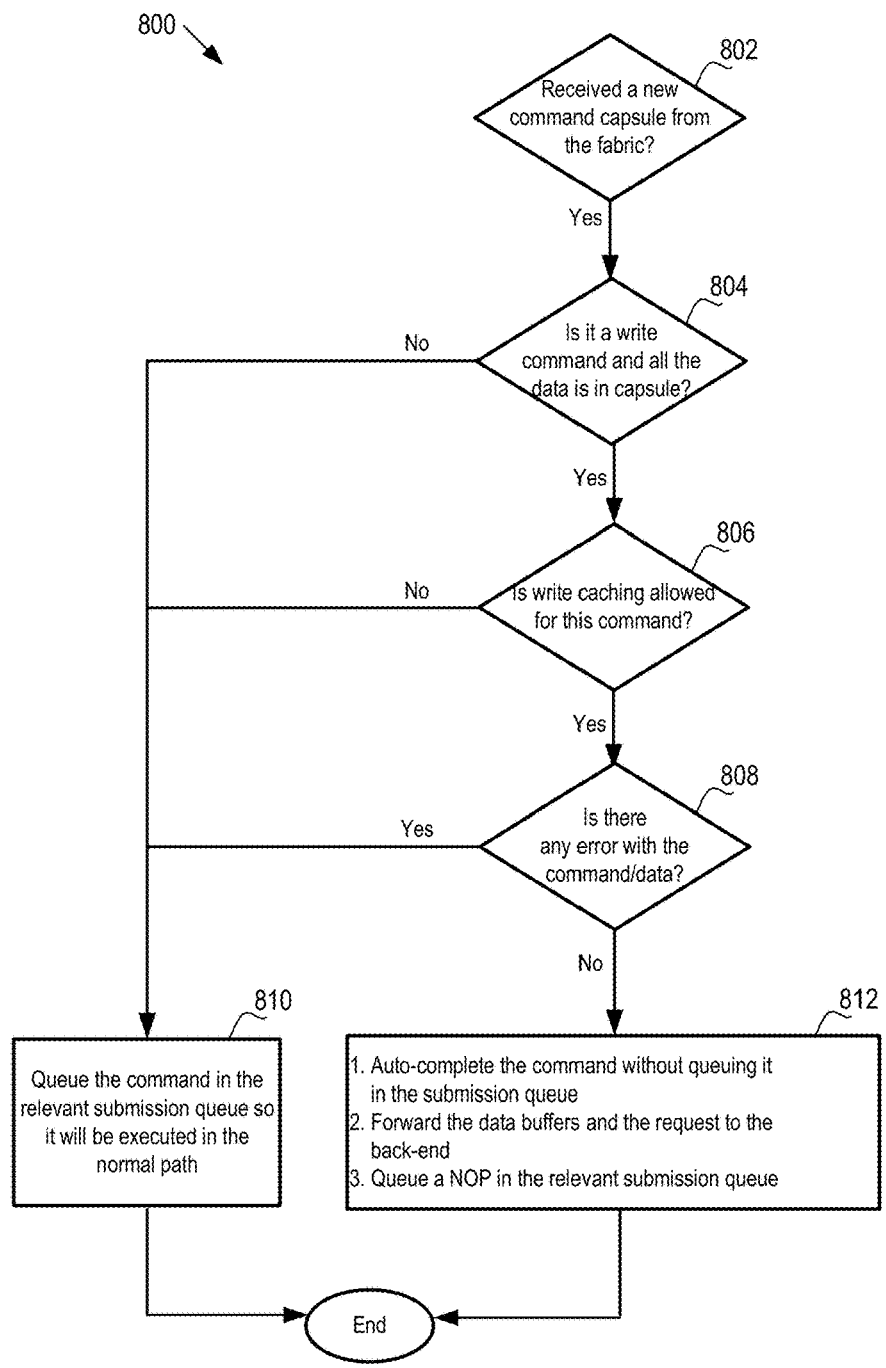
FIG. 8 is a flow chart of the memory device determining whether to queue a command in the submission queue and whether to delay or immediately send the response capsule.

FIG. 8 is a flow chart 800 of the memory device determining whether to queue a command in the submission queue and whether to delay or immediately send the response capsule. At 802, the memory device determines whether a new command capsule has been received from the fabric. If so, at 804, the memory device determines whether the command capsule is for a write command, and whether all of the data is in the capsule. If not, flow chart 800 goes to 810, in which the command is queued in the relevant submission queue so that the command will be executed in the normal path (i.e., not expedited). If so, at 806, the memory device determines whether write caching is allowed for this command. If not, flow chart 800 goes to 810. If so, at 808, the memory device determines whether there is any error with the command and/or with the data. If so, flow chart 800 goes to 810. If not, the memory device: generates an auto-complete message of the command and sends the auto-complete message to the host device without queuing it in the submission queue; forwards the data buffers and the request to the back end; and queues a no operation (NOP) entry in the relevant submission queue.

Lastly, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for a memory device to process a command, the method comprising:
in the memory device:
receiving the command from a host device;
analyzing at least one aspect of the command;
determining, based on the analysis, whether to execute the command without fetching the command from a submission queue;
responsive to determining to execute the command without fetching the command from the submission queue;
executing the command without fetching the command from the submission queue; and
placing a command placeholder, instead of the command, in the submission queue;
and
responsive to determining to execute the command with fetching the command from the submission queue:
placing the command in the submission queue;
fetching the command from the submission queue; and
executing the command.

2. The method of claim 1, wherein the at least one aspect of the command comprises a type of the command.

3. The method of claim 2, wherein:
the type of the command comprises a write command; and
the method further comprises responsive to determining that the type of the command comprises the write command, determining to execute the command without fetching the command from the submission queue.

4. The method of claim 1, wherein:
the command placeholder comprises a no-operation entry; and
placing the command in the submission queue comprises placing at least a part of the command in the submission queue.

5. The method of claim 4, wherein:
the at least one aspect of the command comprises whether the command is a write command, the write command comprising data to write to non-volatile memory in the memory device; and
the method further comprises responsive to determining that the command is a write command:
determining to execute the command without fetching the command from the submission queue; and
placing the no-operation entry in the submission queue as the command placeholder in the submission queue, wherein the no-operation entry does not include any data in the write command.

6. The method of claim 1, further comprising:
responsive to determining to execute the command without fetching the command from the submission queue:
sending a completion message to the host device, the completion message indicative to the host device of completion of execution of the command;
wherein executing the command without fetching the command from the submission queue is performed after sending the completion message.

7. A memory device comprising:
memory comprising a submission queue and a completion queue;
a communication interface configured to communicate with a host device; and
a controller in communication with the memory and the communication interface, the controller configured to:
receive, via the communication interface from the host device, a command for execution;
analyze at least one aspect of the command;
determine, based on analyzing the at least one aspect of the command, whether to bypass execution of the command via the submission queue;
in response to determining to bypass execution of the command via the submission queue:
begin execution of the command without fetching the command from the submission queue; and
place a no-operation entry indicative of the command on the submission queue; and
in response to determining to not bypass execution of the command via the submission queue:
place an entry indicative of executing the command on the submission queue;
fetch the entry from the submission queue; and
responsive to fetching the entry, execute the command.

8. The memory device of claim 7, wherein the controller is configured to:
analyze whether the command is a write command; and
responsive to determining that the command is a write command, bypass execution of the write command via the submission queue.

9. The memory device of claim 7, wherein the controller is further configured to:
review the no-operation entry; and
responsive to the review, determine not to perform any operation.

10. The memory device of claim 7, wherein the controller is further configured to, in response to determining to bypass execution of the command via the submission queue, send a completion message to the host device prior to beginning execution of the command, the completion message indicative to the host device of completion of the execution of the command.

11. A non-volatile memory device comprising:
a fabric communication interface;
a submission queue;
means for analyzing at least one aspect of a command received via the fabric communication interface;
means for determining, based on the analysis, whether to execute the command without fetching the command from the submission queue;
means for, responsive to determining to execute the command without fetching the command from the submission queue, placing a command placeholder other than the command into the submission queue, and executing the command without fetching the command from the submission queue; and
means for, responsive to determining to execute the command by fetching the command from the submission queue, placing the command into the submission queue, fetching the command from the submission queue, and thereafter executing the command.

12. The memory device of claim 7, wherein the at least one aspect of the command comprises a type of the command.

13. The memory device of claim 12, wherein the type of the command comprises a write command.

14. The memory device of claim 7, wherein:
the command comprises a command capsule that includes an indication of a command operation and data on which to execute the command operation.

15. The memory device of claim 7, wherein the controller is further configured to send a completion message to the host device responsive to determining that the command is a first predetermined type or is not a second predetermined type.

16. The memory device of claim 15, wherein the first predetermined type comprises a write command.

17. The memory device of claim 15, wherein the second predetermined type comprises a force unit access (FUA) command.

* * * * *